(12) United States Patent
Garcia Azorero et al.

(10) Patent No.: US 11,784,837 B2
(45) Date of Patent: Oct. 10, 2023

(54) METHODS, POLICY NODE AND CHARGING NODE FOR ENABLING SPENDING LIMIT CONTROL

(71) Applicant: Telefonaktiebolaget LM Ericsson (publ), Stockholm (SE)

(72) Inventors: Fuencisla Garcia Azorero, Madrid (ES); Susana Fernandez Alonso, Madrid (ES); Irene Martin Cabello, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 348 days.

(21) Appl. No.: 17/274,338

(22) PCT Filed: Oct. 11, 2018

(86) PCT No.: PCT/EP2018/077678
§ 371 (c)(1),
(2) Date: Mar. 8, 2021

(87) PCT Pub. No.: WO2020/052789
PCT Pub. Date: Mar. 19, 2020

(65) Prior Publication Data
US 2022/0239511 A1    Jul. 28, 2022

(30) Foreign Application Priority Data
Sep. 11, 2018  (EP) .................... 18382651

(51) Int. Cl.
*H04M 15/00* (2006.01)
*H04L 12/14* (2006.01)

(52) U.S. Cl.
CPC ...... *H04L 12/1407* (2013.01); *H04L 12/1417* (2013.01); *H04M 15/64* (2013.01); *H04M 15/66* (2013.01); *H04M 15/852* (2013.01)

(58) Field of Classification Search
CPC ............ H04L 12/1407; H04L 12/1417; H04M 15/64; H04M 15/66; H04M 15/852
See application file for complete search history.

(56) References Cited

U.S. PATENT DOCUMENTS 9,602,676 B2 * 3/2017 Lehane ................ H04M 15/64
9,648,173 B2 * 5/2017 Cheuk ................ H04M 15/842
(Continued)

OTHER PUBLICATIONS

International Search Report and Written Opinion dated May 29, 2019 for International Application No. PCT/EP2018/077678 filed Oct. 11, 2018, consisting of 15-pages.
(Continued)

*Primary Examiner* — Pakee Fang
(74) *Attorney, Agent, or Firm* — Christopher & Weisberg, P.A.

(57) ABSTRACT

Methods, a policy node and a charging node for enabling spending limit control for a user equipment in a telecommunication network. The policy node obtains an identifier related to the user equipment, an identifier of a policy counter and a set of policy counter statuses to be monitored by the policy node. The set of policy counter statuses are related to the identifier of the policy counter. The policy node sends, a request for reporting of policy counter statuses related to the user equipment for the policy counter. The request includes the identifier related to the user equipment, the identifier of the policy counter and the set of policy counter statuses. A policy counter status of the set of policy counter statuses is determined. The policy counter status has changed as determined by the charging node. A response to the request is sent and includes the policy counter status that has changed.

2 Claims, 5 Drawing Sheets

(56) References Cited

U.S. PATENT DOCUMENTS

| | | |
|---|---|---|
| 9,755,891 B2* | 9/2017 | D'Souza .................. H04L 47/70 |
| 2017/0134459 A1* | 5/2017 | Shetty ..................... H04L 65/80 |
| 2017/0163821 A1 | 6/2017 | Payette et al. |
| 2018/0176389 A1 | 6/2018 | Kumar et al. |

OTHER PUBLICATIONS

3GPP TS 23.502 V15.2.0; 3rd Generation Partnership Project; Technical Specification Group Services and System Aspects; Procedures for the 5G System; Stage 2 (Release 15); Jun. 2018, consisting of 308-pages.

3GPP TS 23.203 V15.4.0; 3rd Generation Partnership Project; Technical Specification Group Services and System Aspects; Policy and charging control architecture (Release 15); Sep. 2018, consisting of 262-pages.

3GPP TS 23.501 V15.3.0; 3rd Generation Partnership Project; Technical Specification Group Services and System Aspects; System Architecture for the 5G System; Stage 2 (Release 15); Sep. 2018, consisting of 226-pages.

3GPP TS 23.503 V15.3.0; 3rd Generation Partnership Project; Technical Specification Group Services and System Aspects; Policy and Charging Control Framework for the 5G System; Stage 2 (Release 15); Sep. 2018, consisting of 70-pages.

3GPP TS 29.219 V15.1.0; 3rd Generation Partnership Project; Technical Specification Group Core Network and Terminals; Policy and Charging Control: Spending Limit Reporting over Sy reference point (Release 15); Mar. 2018, consisting of 23-pages.

* cited by examiner

METHODS, POLICY NODE AND CHARGING NODE FOR ENABLING SPENDING LIMIT CONTROL

CROSS-REFERENCE TO RELATED APPLICATIONS

This application is a Submission Under 35 U.S.C. § 371 for U.S. National Stage Patent Application of International Application No.: PCT/EP2018/077678, filed Oct. 11, 2018 entitled "METHODS, POLICY NODE AND CHARGING NODE FOR ENABLING SPENDING LIMIT CONTROL," which claims priority to European Application No.: 18382651.0, filed Sep. 11, 2018, the entireties of both of which are incorporated herein by reference.

TECHNICAL FIELD

Embodiments herein relate to wireless communication networks, such as telecommunication networks. In particular, a method and a policy node for enabling spending limit control as well as a method and a charging node for enabling spending limit control are disclosed. Corresponding computer programs and computer program carriers are also disclosed.

BACKGROUND

An operator of a telecommunication network typically wishes to charge subscribers based on their use, e.g. time spent in phone calls, number of text messages sent, downloaded or uploaded amount of data e.g. due to surfing on the Internet or the like. A subscriber is typically associated with a subscription, or subscription plan, which defines e.g. how many phone calls, etc. are included in the subscription. In order to keep track of the use, the telecommunication network can comprise so called policy and charging functions, which monitor the subscribers use and if a subscriber has e.g. run out of data, the subscriber may be blocked from spending further data or set on a limited data rate. In short, the operator wishes to ensure that the subscription is enforced, i.e. not violated.

Spending Limit Control, as defined in Third Generation Partnership Project (3GPP) Technical Specification (TS) 23.503, aids the operator in the monitoring of the above mentioned kind. The 3GPP specifies Spending Limit Control for both Evolved Packet Core (EPC) and fifth generation core network (5GC) in the same or similar terms.

For EPC, an Online Charging System (OCS) notifies a Policy and Charging Rules Function (PCRF) of policy counter status changes, as defined in clause 6.9 of 3GPP TS 23.203. A policy counter is used to keep track of e.g. amount of data used, number of phone calls made, number of text messages sent or the like.

For 5GC, a Charging function (CHF) notifies a Policy Control Function (PCF) of policy counter status changes, as defined in clauses 5.3.8 and 6.1.3.17 of 3GPP TS 23.503.

In both EPC and 5GC, some procedures are defined: Initial or Intermediate Spending Limit Report Retrieval, Spending Limit Report Notification and Cancelation of spending limit reporting.

Initial or Intermediate Spending Limit Report Retrieval, by which the PCRF/PCF can retrieve a policy counter status of an indicated policy counter and the PCRF/PCF can subscribe to notification, i.e. request the OCS/CHF to send notification, of future policy counter status changes of the indicated policy counters from the OCS/CHF.

Spending Limit Report Notification procedure, by which the OCS/CHF notifies the PCRF/PCF of changes in a status of a subscribed policy counter, and optionally pending, or future, statuses of this policy counter together with their activation time. E.g. a counter may be reset at end of a billing period, and as such, this is its pending status at the end of the billing period, i.e. the activation time.

Cancelation of spending limit reporting, indicated e.g. with the Intermediate Spending Limit Report Retrieval to cancel reporting of a subset of the subscribed policy counters or e.g. with a Final Spending Limit Report Retrieval procedure to cancel the reporting of all subscribed policy counters.

Apart from the above, there may be a Termination of the Subscription of status changes for all policy counters initiated by the OCS/CHF.

For 5GC, 3GPP TS 23.502, clause 5.2.17.2 discloses a Spending Limit Control service with an interface known as Nchf_SpendingLimitControl, which is offered by the CHF and available for any Network Function (NF) service consumer, such as the PCF in case of 5GC. For 3G and 4G, a corresponding interface between the PCRF and the OCS is known as Sy interface.

Clause 4.16.8 in TS 23.502 discloses interaction between the PCF and the CHF to obtain the functionality defined for the Nchf_SpendingLimitControl interface.

During the Initial Spending Limit Report Retrieval, the PCF may provide a list of policy counter identifiers to subscribe to notification of changes in policy counter statuses for those policy counters that are included in the list. If the PCF does not provide the list of policy counter identifiers, the PCF defaults to subscribing to notification of changes for all policy counters running in the CHF.

With the Intermediate Spending Limit Report Retrieval, the PCF modifies the list of policy counter identifiers to retrieve the status of additional policy counters available at the CHF, or to unsubscribe from notification of change for specific policy counters.

Even if the PCF is able to choose which policy counters to be included in the list, e.g. based on what information is needed to perform policy control, and adjust a related policy to be applied for a user equipment, there may be scenarios in which further flexibility may be required.

SUMMARY

An object may thus be to increase flexibility of an interface between a policy node and a charging node, such as between the PCF and the CHF in the above mentioned 5GC network or between the PCRF and the OCS in the above mentioned 4G network or the like.

According to an aspect, the object is achieved by a method, performed by a policy node, for enabling spending limit control for a user equipment in a telecommunication network. The policy node obtains an identifier related to the user equipment, an identifier of a policy counter and a set of policy counter statuses to be monitored by the policy node. The set of policy counter statuses are related to the identifier of the policy counter.

The policy node sends, to a charging node, a request for reporting of policy counter statuses related to the user equipment for the policy counter. The request comprises the identifier related to the user equipment, the identifier of the policy counter and the set of policy counter statuses. The policy node receives, from the charging node, a response to the request. The response comprises a policy counter status of the set of policy counter statuses. Optionally, the response may comprise the identifier of the policy counter. The policy counter status has changed, such as matched, as determined by the charging node.

According to another aspect, the object is achieved by a method, performed by a charging node, for enabling spending limit control for a user equipment in a telecommunication network. The charging node receives, from a policy node, a request for reporting of policy counter statuses related to the user equipment for a policy counter. The request comprises an identifier related to the user equipment, an identifier of the policy counter and a set of policy counter statuses. The charging node determines a policy counter status of the set of policy counter statuses. The policy counter status has changed as determined by the charging node. The charging node sends, to the policy node, a response to the request. The response comprises the policy counter status that has changed. Optionally, the response may comprise the identifier of the policy counter.

According to a further aspect, the object is achieved by a policy node configured for enabling spending limit control for a user equipment in a telecommunication network. The policy node is configured for obtaining an identifier related to the user equipment, an identifier of a policy counter and a set of policy counter statuses to be monitored by the policy node. The set of policy counter statuses are related to the identifier of the policy counter.

The policy node is configured for sending, to a charging node, a request for reporting of policy counter statuses related to the user equipment for the policy counter. The request comprises the identifier related to the user equipment, the identifier of the policy counter and the set of policy counter statuses. The policy node is configured for receiving, from the charging node, a response to the request. The response comprises a policy counter status of the set of policy counter statuses. Optionally, the response may comprise the identifier of the policy counter. The policy counter status has changed as determined by the charging node.

According to a still further aspect, the object is achieved by a charging node configured for enabling spending limit control for a user equipment in a telecommunication network. The charging node is configured for receiving, from a policy node, a request for reporting of policy counter statuses related to the user equipment for a policy counter. The request comprises an identifier related to the user equipment, an identifier of the policy counter and a set of policy counter statuses.

The charging node is configured for determining a policy counter status of the set of policy counter statuses. The policy counter status has changed as determined by the charging node. The charging node is configured for sending, to the policy node, a response to the request. The response comprises the policy counter status that has changed. Optionally, the response may comprise the identifier of the policy counter.

In some examples, the request may comprise the indication about condition for reporting, wherein the condition for reporting may concern whether reporting is to be performed when a policy counter matches a corresponding policy counter status or when the policy counter no longer matches the corresponding policy counter status.

The charging node may thus use the indication about condition for reporting when determining whether or not to report/notify about a particular policy counter status for a particular policy counter identifier.

If the policy node does not indicate the conditions that shall trigger the notification, the charging node, based on configuration, may assume that the notification shall be triggered when matched and no longer matched.

The policy node may be configured for receiving, from the charging node, a response to the request. The response may comprise a policy counter status (or statuses) of the set of policy counter statuses together with the policy counter identifier.

According to further aspects, the object is achieved by computer programs and computer program carriers corresponding to the aspects above.

Thanks to that the policy node specifies in the request the set of policy counter statuses, for which notification of change is desired, benefits in both the policy node and the charging node are obtained.

For the policy node, a benefit may be that the policy node only receives notification concerning those policy counter statuses that are included in the set, i.e. said those policy counter statuses may be a subset of all available policy counter statuses in the charging node. For example, those policy counter statuses that are included in the set achieve a specific counter status or move away from said specific counter status. Hence, the policy node may receive less signaling than if the set of policy counter statuses is not included in the request.

Similarly, a benefit for the charging node may also be that less signaling is sent to the policy node. Moreover, the charging node may also need to perform less processing, or monitoring, in order to determine that any one of the policy counter statuses of the set has changed. The signaling may be less compared to if no set of policy counter statuses is included in the request, in which case the charging node may be required to perform processing, or monitoring, for all available policy counter statuses and send notifications accordingly.

As a more detailed example, the request may be embodied in the form of an enhanced Nchf_SpendingLimitControl_Subscribe message. That is, the request may indicate, together with at least one identifier of a policy counter, the set of policy counter statuses for which the policy node is interested in receiving one or more notifications of change.

In this manner, the embodiments herein allow for filtering of notifications of change on a per policy counter identifier basis and on a per policy counter status basis.

An advantage is that interaction between the policy node and the charging node may be more efficient, e.g. in terms of that superfluous signaling may be omitted. This may mean that the policy node is relieved from receiving signaling that the policy node is not interested in. Accordingly, the embodiments herein achieve increased flexibility in terms of how notifications of change may be configured.

BRIEF DESCRIPTION OF THE DRAWINGS

The various aspects of embodiments disclosed herein, including particular features and advantages thereof, will be readily understood from the following detailed description and the accompanying drawings, which are briefly described in the following.

DETAILED DESCRIPTION

Figure 1:
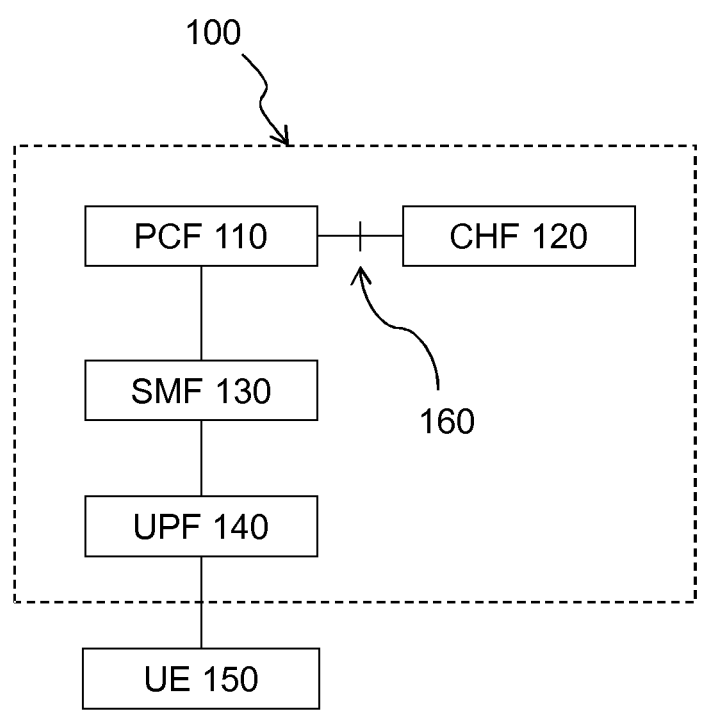
FIG. 1 is a schematic overview of an exemplifying network in which embodiments herein may be implemented.

In order to better appreciate the embodiments herein, existing solutions and their limitations are analyzed and discussed here.

The Sy and Nchf_SpendingLimitControl interfaces allow for a policy node to subscribe to notification about change of policy counter status (or statuses) for a specific policy counter as given by an identifier of the policy counter.

However, the PCRF/PCF may be interested in receiving a notification only when the specific policy counter achieves a specific counter status or moves away from the specific counter status. Regardless, the PCRF/PCF is required to subscribe to notification about changes in all available policy counter statuses for the specific policy counter according to known solutions for the Sy and Nchf_SpendingLimitControl interfaces.

In 3G or 4G, this aspect may not be a severe limitation because the only client of the OCS (OCS client) using Sy interface is the PCRF and policy counters and policy counter statuses can be defined specifically per use case with specific usage requirements. In case other OCS clients are interested in usage information, new policy counters may be defined using a request via another interface, i.e. not the Sy interface but a new similar interface for any generic OCS client. Therefore, the policy counter statuses may again be specifically agreed per use case with specific usage requirements.

As an example, assume that there is a continuous accumulation of volume usage of Gold Subscribers, at the OCS, for charging purposes.

To perform Quality of Service (QoS) limitation for a subscriber at e.g. a 2 GB limit according to the subscriber's subscription, or product plan definition, the OCS may define a policy counter 'GoldMBBCounter' with statuses '2GBlimit' and 'under2GBlimit' which is only used by the PCRF via the Sy interface. When the PCRF is informed of any of these status, it will apply an associated policy, e.g. when the status '2GBlimit' is reached, the QoS related to a user session of the subscriber will be limited to e.g. 512 Kbps. When the status is 'under2Glimit', the user session is allowed a QoS of more than 512 Mbps.

To enable analysis of usage behavior of Gold Subscribers, the OCS may define a policy counter 'GoldCounterCustomerCare' with statuses '1GBlimit', '1.5GBlimit', '2GBlimit', '2.5GBlimit' which is only used by a function handling the analysis of usage behavior.

However, this is an inefficient manner of exposing usage information to different consumers, such as the function handling the analysis of usage behavior, since it requires—per use case and per NF service consumer—a particular definition of specific policy counters and policy counters statuses. As a number of NF service consumers increases, the number of definitions of policy counters and policy counter statuses increases, whereby an NF service producer may become unnecessarily overloaded with definitions and processing caused by the definitions.

In 5GC, this limitation may become more severe. The fact that any number of NF service consumers may invoke a service, e.g. using Nchf_SpendingLimitControl, at any time, makes the former approach using multiple definitions as per use case unfeasible and favors scenarios with well-known general purpose policy counters and policy counter statuses. That is, in the example above, the CHF would define the counter 'GoldCounter' with policy counter statuses '1GBlimit', '1.5GBlimit', '2GBlimit', '2.5GBlimit', 'counterRestarted'.

These new scenarios, where other NF service consumers than the PCF interface with the CHF, may increase the number of policy counter status defined for a policy counter far beyond those policy counters that are of interest to the PCF. This may result in that the PCF subscribes to and receives information that is not relevant to it. Thereby, resources of the 5G system are used inefficiently.

In view of the above, it is herein proposed to enhance the interface between e.g. the PCF and the CHF in case of 5GC and the interface between PCRF and OCS in case of 3G and/or 4G.

Throughout the following description of the embodiments herein, similar reference numerals have been used to denote similar features, such as nodes, actions, modules, circuits, parts, items, elements, units or the like, when applicable. In the Figures, features that appear in some embodiments are indicated by dashed lines.

FIG. 1 depicts an exemplifying network 100 in which embodiments herein may be implemented. In this example, the network 100 is a 5GC network.

In other examples, the network 100 may be, or may be at least a part of, any cellular or wireless communication network, such as an EPC network, a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band, or a Wideband Code Division Multiple Access (WCDMA), Universal Terrestrial Radio Access (UTRA) TDD, Ultra-Mobile Broadband (UMB), Global System for Mobile communications (GSM) network, GSM/Enhanced Data Rate for GSM Evolution (EDGE) Radio Access Network (GERAN) network, EDGE network, a network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), 5G system or any cellular network or system.

The network 100 may be said to comprise a policy node 110, or more generally a NF service consumer. The policy node 110 may comprise any one selected from a set comprising:

a PCF e.g. in case of 5G,
a PCRF e.g. in case of 3G or 4G, and
any other node that have the same or similar functionality in other networks or systems.

Moreover, the network may be said to comprise a charging node 120, or more generally a NF service producer. The charging node 120 may comprise any one selected from a set comprising:

a CHF e.g. in case of 5G,
an OCS e.g. in case of 3G or 4G, and
any other node that have the same or similar functionality in other networks or systems.

FIG. 1 further illustrates known entities of a 5G network, such as a Session Management Function (SMF) 130 and a User Plane Function (UPF) 140, which have their known functions and capabilities, the description thereof being omitted herein for reasons of simplicity. A reason for displaying them in the Figure is nevertheless to put a user equipment 150 into relationship with the policy node 110 and the charging node 120.

Hence, the network 100 may be said to comprise the user equipment 150. This means that the user equipment 150 is present in the network 100. For example, the user equipment 150 may be attached to the network 100 due to webbrowsing, an ongoing phone call or the like. In other examples, the user equipment 150 may be idle, e.g. waiting for a user to make a phone call, browse the web or to receive a phone call from someone else.

The policy node 110 may communicate, e.g. via an interface 160, such as an enhanced version of Nchf_SpendingLimtControl as disclosed by the embodiments herein, with the charging node 120. This communication may include control transmissions relating to spending limit control.

Figure 2:
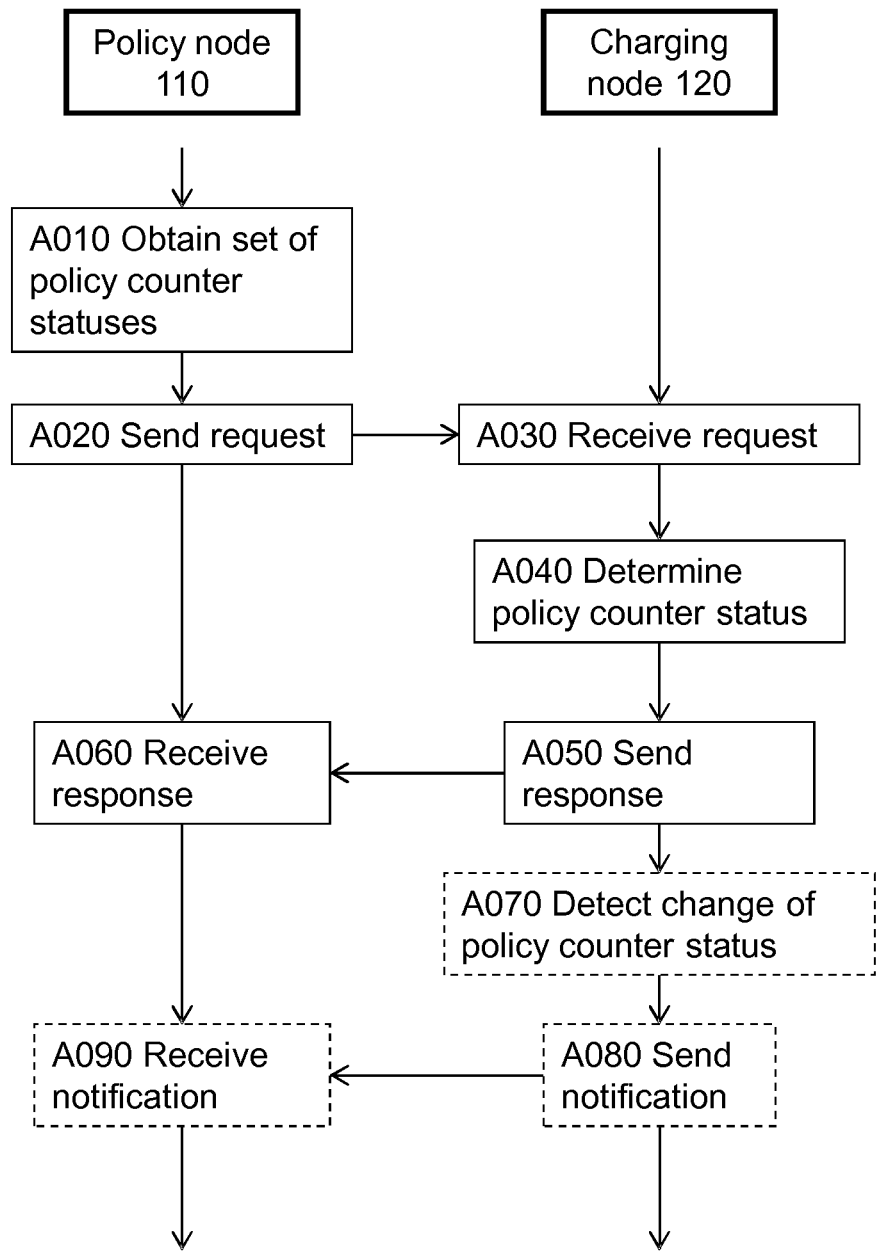
FIG. 2 is a combined signaling and flowchart illustrating the methods herein.

Some terms and expressions used herein are briefly described, before proceeding with a detailed description of FIG. 2, in which the policy node 110 is taken as an example of a NF service consumer and the charging node 120 is taken as an example of a NF service producer. The NF service consumer may thus be a NF service consumer node, or a first core network node, and the NF service producer may be a NF service producer node, or a second core network node.

As used herein, the term "user equipment" may refer to a wireless communication device, a machine-to-machine (M2M) device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The term "user" may indirectly refer to the wireless device. Sometimes, the term "user" may be used to refer to the user equipment or the like as above. It shall be understood that the user may not necessarily involve a human user. The term "user" may also refer to a machine, a software component or the like using certain functions, methods and similar.

An identifier of a policy counter may be referred to as "policy counter identifier". The identifier of the policy counter may e.g. be a policyCounterId, e.g. "GoldMBB-Counter" or the like. The policy counter typically keeps track of GB-consumption, bitrate etc., which is used as condition for whether or not to change a policy that applies to a certain user equipment, or subscriber. The policy is used such as to enforce a subscription plan that the subscriber has been granted, e.g. due to payment.

A set of policy counter statuses, sometimes policyCounterStatusList, are the policy counter statuses that the PCF 110 wishes to receive notifications about, i.e. not every possible status for the given policyCounterId. E.g. '2GBlimit' (reached), 'under2GBlimit' etc. The term "policy counter status" refers to "status of policy counter".

An identifier related to the user equipment 150 may be a subscriber identity (ID), Subscriber Permanent Identifier (SUPI), or the like.

FIG. 2 illustrates an exemplifying method according to embodiments herein when implemented in the network 100 of FIG. 1.

The policy node 110 performs a method for enabling spending limit control for the user equipment 150 in the telecommunication network 100. Likewise, the charging node 120 performs a method for enabling spending limit control for the user equipment 150 in the telecommunication network 100.

One or more of the following actions may be performed in any suitable order.

Action A010

The policy node 110 obtains an identifier related to the user equipment 150, an identifier of a policy counter and a set of policy counter statuses to be monitored by the policy node 110. The set of policy counter statuses are related to the identifier of the policy counter. The identifier related to the user equipment 150, the identifier of the policy counter and the set of policy counter statuses may be e.g. configured in the policy node 110 by the operator, or e.g. received from another entity, such as a provisioning system, not illustrated in any Figure. The identifier related to the user equipment 150, the identifier of the policy counter and the set of policy counter statuses may be associated in the policy node 110.

When the policy node 110 receives the identifier related to the user equipment 150 from the SMF 130, the identifier of the policy counter and the set of policy counter statuses, which are associated to the received identifier related to the user equipment 150, may be determined by the policy node 110 in order to set and apply a particular policy for the user equipment 150, whereby a subscription plan related to the user equipment 150 may be enforced.

Action A020

The policy node 110 sends, to the charging node 120, a request for reporting of policy counter statuses related to the user equipment 150 for the policy counter. The request comprises the identifier related to the user equipment 150, the identifier of the policy counter and the set of policy counter statuses. As an example relating to 5GC, the request may comprise an Nchf_SpendingLimitControl_Subscribe message.

In some embodiments, the request may comprise an indication about condition for reporting, such as notificationConditionInfo or the like. The condition for reporting concerns whether reporting is to be performed when the policy counter matches a corresponding policy counter status of the set of policy counter statuses or when the policy counter no longer matches the corresponding policy counter status of the set of policy counter statuses. For example, assuming there is a policy counter identifier "GoldMBB-Counter" with policy counter statuses "1GBreached" and "2GBreached", then when the policy counter identifier "GoldMBBCounter" counts 1.5 GB, the policy counter status "1GBreached" matches, but the policy counter status "2GBreached" does not match.

The charging node 120 thus uses the indication about condition for reporting when determining whether or not to report, or notify, about a particular policy counter status for a particular policy counter identifier. The indication about condition for reporting thus determines whether the charging node 120 notifies about matching policy counter status or not matching policy counter status, e.g. on a per identifier of policy counter basis or on a per policy counter status and identifier of policy counter basis. In the former case, all policy counter statuses of a certain identifier of policy counter are notified in the same way, e.g. on match or on not matching. In the latter case, each policy counter status of a specific identifier of policy counter may have their respective condition for reporting, e.g. one or more policy counter statuses are reported on match and/or one or more other policy counter statuses are reported on not matching.

Action A030

Subsequently to action A020, the charging node 120 receives, from the policy node 110, the request for reporting of policy counter statuses related to the user equipment 150 for a policy counter.

Action A040

The charging node 120 determines a policy counter status of the set of policy counter statuses. This may mean that the charging node 120 is instructed to monitor the set of policy counter statuses and if one of the policy counter statuses has changed, said one of the policy counter statuses will be selected to be said policy counter status, which further will be reported in action A050. Therefore, it may be said that the policy counter status has changed as determined by the charging node 120. This kind of reporting may herein be referred to as that the policy node 110 subscribes to reporting of counter statuses or counter status changes. It may even be said that the policy node 110 has a subscription for this reporting. Notably, in this context the term "subscription" is different from a user's subscription, i.e. the user's typically monthly paid plan.

In some examples, the charging node 120 may detect that one or more policy counter statuses of the set of policy counter statuses have changed. In these examples, a subset of policy counter statuses that have changed may be reported in action A050 below.

Action A050

Accordingly, the charging node 120 sends, to the policy node 110, a response to the request. In order to inform the policy node 110 of which—if any—policy counter status has changed, the response comprises the policy counter status that has changed.

Action A060

Subsequently to action A050, the policy node 110 receives, from the charging node 120, the response to the request. As already mentioned, the policy counter status has changed, i.e. the policy counter status match or no longer match, as determined by the charging node 120.

Actions A070 to A090 below may relate to an enhancement of Nchf_SpendingLimitControl_Notify or similar interface.

Action A070

The charging node 120 may detect that a previous policy counter status has changed to a current policy counter status and that the current policy counter status complies with the indication about condition for reporting.

Action A080

The charging node 120 may send, to the policy node 110, a notification of change in policy counter status. The notification comprises the identifier related to the user equipment 150, the current policy counter status, and the indication about the condition for reporting. The current policy counter status is sent along, e.g. in the notification, with other information as is known in the art. For example the charging node may send SUPI, target address, identifier of the policy counter, etc. The notification may be a Nchf_SpendingLimitControl_Notify message or the like.

The charging node 120 may further send the indication about condition for reporting if desired. This may be advantageous, for example, in case the policy node 110 subscribes to status when no longer matched and it is the firstly received report.

Action A090

Subsequently to action A080, the policy node 110 may receive, from the charging node 120, the notification of change in policy counter status. The notification may comprise: the identifier related to the user equipment 150, the policy counter status of the set of policy counter statuses that changed, the identifier of the policy counter and a current indication about condition for reporting the notification. Here, the policy counter status may be the same policy counter status as in action A050, or the policy counter status mentioned here may be a further policy counter status, which e.g. may be different from the policy counter status of action A050. The current indication indicates whether the policy counter status matches or no longer matches, i.e. not matches.

In more detail, the embodiments above imply that the Initial and Intermediate Spending Limit Report Retrieval and Spending Limit Notification may be performed as follows. For ease of description, the policy node 110 is referred to as PCF 110 and the charging node 120 is referred to as CHF 120.

During the Initial Spending Limit Report Retrieval, an NF service consumer, e.g. the PCF 110, may provide a list of policy counter identifiers to subscribe to notification of changes of policy counter statuses. In addition, according to some embodiments herein, the NF service consumer may indicate per policy counter identifier the set of policy counter statuses that triggers a notification from the CHF 120 when a policy counter status of the set of policy counter statuses is matched or when it is no longer matched. The NF service consumer may also include the indication about condition for reporting, aka a notificationConditionInfo attribute, that indicates whether the notification may be done when the policy counter status is matched or when the policy counter status no longer is matched. If the NF service consumer does not provide the list of policy counter identifiers, the NF service consumer typically subscribes to all available policy counters and all available policy counter status changes.

During the Intermediate Spending Limit Report Retrieval, the NF service consumer may modify the list of policy counter identifiers to retrieve the policy counter status of additional policy counters available at the CHF or to unsubscribe from notification of specific policy counters according to know manners. In addition, according to some embodiments herein, the NF service consumer may modify per policy counter identifier, the set of policy counter statuses that triggers a notification from the CHF 120 when the policy counter status of the set of policy counter statuses is matched and when it is no longer matched. The NF service consumer may also include the indication about condition for reporting that indicates whether the notification may be done when the policy counter status is matched or when the policy counter status no longer is matched.

For both the Initial and Intermediate Spending Limit Report Retrieval, when the conditions are met, the CHF 120 may provide the indication about condition for reporting that applies for the corresponding policy counter(s), or corresponding identifier(s) of policy counter(s). It is also possible that the NF service producer provides the notificationConditionInfo, regardless if the NF service consumer indicated the notificationConditionInfo, e.g. in action A020 above, or not. In this case, the NF service consumer may only use the relevant information according to its policies to be applied.

Figure 3:
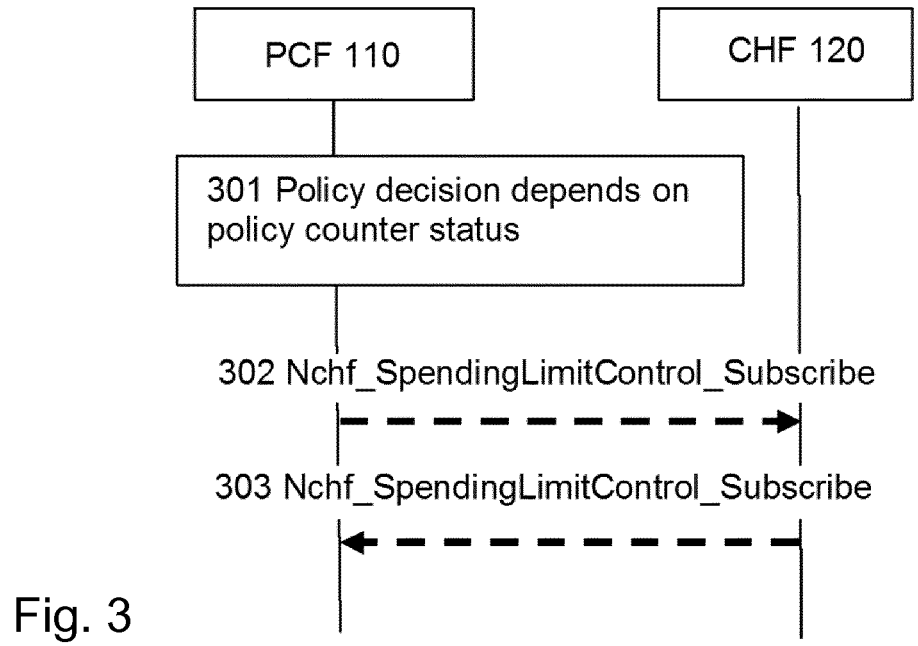
FIG. 3 is another exemplifying combined signaling and flowchart illustrating an exemplifying method.

Now turning to FIG. 3, an exemplifying method relating to Initial Spending Limit Report Retrieval is described. FIG. 3 illustrates signaling flow for the PCF 110 to retrieve the status of the policy counters available at the CHF 120. Further, the PCF 110 may subscribe to spending limit reporting, i.e. to notifications of policy counter status changes, from the CHF 120.

If the PCF 110 provides the list of policy counter identifiers, the CHF 120 returns the policy counter status per policy counter identifier provided by the PCF according to known manners.

If the PCF 110 provides the list of policy counter identifiers and per each policy counter identifier of the list, the set of policy counter statuses, or in more detail a respective set of policy counter statuses for each policy counter identifier of the list of policy counter identifiers. The set of policy counter statuses may trigger a notification when matched or no longer matched as detected by the CHF 120. Then, the CHF 120 may return the policy counter status per policy counter identifier only if current policy counter status matches at least one policy counter status of the set of policy counter statuses.

Again, as an example of some embodiments herein, the PCF 110 may indicate that it is only interested in being notified about a change related to a certain policy counter status, e.g. '2GBlimit' for the policy counter identifier 'GoldMBBCounter'. This may assume that the 'GoldMBB-Counter' may e.g. define other counter status, such as '1GBlimit', '5GBlimit', '10GBlimit' etc., which are not of interest to the PCF 110, and thus the PCF 110 does not subscribe to changes related to these policy counter statuses. In addition, the PCF 110 may provide the notificationConditionInfo attribute related to this policy counter to indicate that it is interested in being notified only when the "2GBlimit" is reached.

If the PCF 110 does not provide the list of policy counter identifiers, the CHF 120 returns the policy counter status of all policy counters, which are available for this subscriber, according to known manners.

If the PCF 110 provides the list of policy counter identifiers and related policy counter statuses, but does not provide the indication about condition for reporting, the CHF 120 may, based on configuration, assume that the notification shall be triggered when matched or no longer matched.

Further, the CHF 120 may default to sending a notification when matched or no longer matched as deemed appropriate. Thanks to that the PCF 110 provided the set of policy counter statuses it is interested in, the PCF 110 may then only make use of and receive information being relevant according to its policies to be applied towards the user equipment 150.

The Initial Spending Limit Report Retrieval includes all subscriber identifiers associated with the user equipment 150 available at the PCF 110. The subscriber identifiers may be exemplary identifiers related to the user equipment 150.

One or more of the following actions may be performed in any suitable order.

Action 301

The PCF 110 may retrieve subscription information, e.g. from another network node or configured in the PCF 110, that indicates that policy decisions depend on policy counter status of at least one policy counter held by the CHF 120. Furthermore, the PCF 110 may retrieve at least one policy counter identifier, or even an entire list of policy counter identifiers—previously referred to as the list of policy counter identifiers, and possibly also at least one policy counter status that the PCF 110 is interested in receiving a notification about change of said at least one policy counter status. This action may be similar to action A010.

Action 302

The PCF 110 may send a request, such as Nchf_SpendingLimitControl_Subscribe if this is the first time policy counter status notification is requested for the user identified by a SUPI. The request may include: a subscriber ID, e.g. SUPI, the indication about condition for reporting, optionally, the list of policy counter identifiers, the Notification Target Address, Event Reporting Information (continuous reporting). This request is the same or similar as the request in FIG. 2. Per policy counter identifier of the list of policy counter identifiers, the PCF 110 may include the set of policy counter statuses for which the CHF 120 shall notify about change. A possible implementation is to provide multiple instances of a policyCounterSubscriptionInfo (shown below) including the counterId and related one or more counterstatuses. Thus, there may be a respective set of policy counter statuses for each policy counter identifier of the list, where the respective set of policy counter statuses is represented by a respective instance of the policyCounterSubscriptionInfo. The PCF 110 may also include the notificationConditionInfo as part of the policyCounterSubscriptionInfos to indicate whether the CHF 120 may notify about change when policy counter status is matched or no longer matched.

Definition of Type PolicyCounterSubscriptionInfo:

| Attribute name | Data type | P | Cardinality | Description |
| --- | --- | --- | --- | --- |
| policyCounterId | string | M | 1 | Identifies the requested policy counter. |
| policyCounterStatusList | array (string) | O | 1 ... N | Identifies the policy counter status(es) applicable for a specific policy counter identified by the policyCounterId. |
| notificationConditionInfo | string | O | 0 ... 1 | Provides info about if the notification is triggered when the status is matched (e.g. over 2 GB subscribed status) or no longer matched (e.g. no longer over 2 GB). |

Another possible implementation is that per policy counter status, it is indicated when the notification may be triggered, i.e. when match or when no longer matched.

In this example, the PolicyCounterSubscriptionInfo data type may replace the PolicyCounterId data type in table 5.6.2.2 SpendingLimitContext in TS 29.594.

This action is similar to action A020.

Action 303

The CHF 120 may respond to the Nchf_SpendingLimitControl_Subscribe message that includes a Subscription Correlation Id, and policy counter statuses of interest to the PCF 110, and optionally pending policy counter statuses and their activation times, per required policy counter identifier.

The Subscription Correlation Id is used to identify a subscription concerning reporting of status changes that the PCF 110 have requested. Furthermore, the CHF 120 may store the PCF's subscription to spending limit reports for these policy counters for later use.

If the request included the set of policy counter statuses, the CHF 120 may notify on policy counter status matched, or no longer matched, the response includes the policy counter statuses that match for a policy counter identifier, and optionally the indication about condition for reporting together with their activation times in case of pending policy counter statutes. The CHF 120 may store the policy counter statuses according to the PCF's subscription for these policy counters.

If no policy counter identifier was provided the CHF 120 may return the policy counter status, optionally including pending policy counter statuses and their activation times, for all policy counters, which are available for this subscriber, aka user equipment 150, and stores the PCF's subscription to spending limit reports of all policy counters provided to the PCF 110.

This action is similar to action A050.

Figure 4:
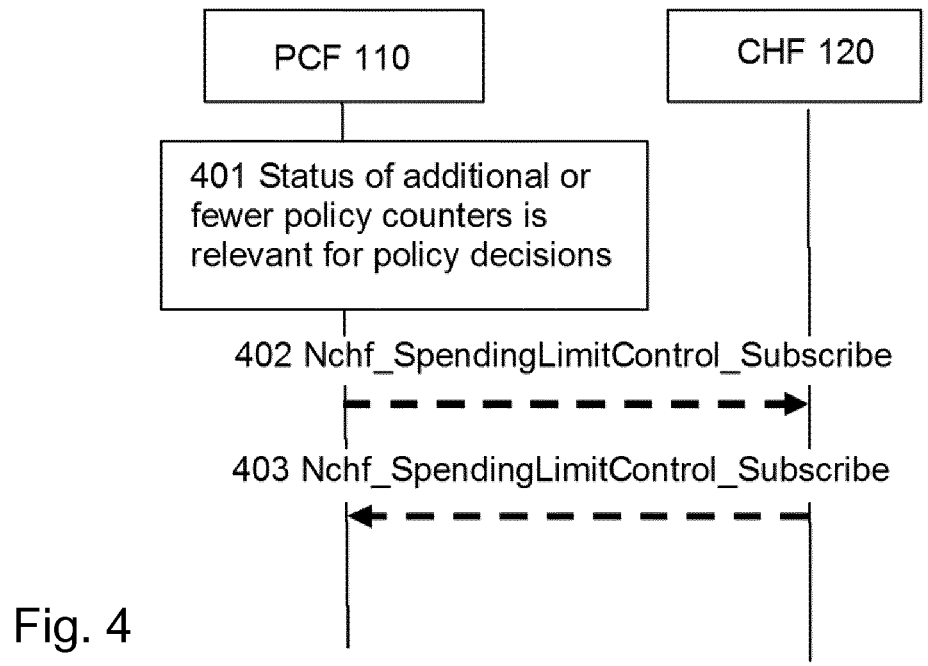
FIG. 4 is a further exemplifying combined signaling and flowchart illustrating another exemplifying method.

Furthermore, FIG. 4 illustrates an exemplifying method relating to Intermediate Spending Limit Report Retrieval. FIG. 4 describes signaling flow for the PCF 110 to retrieve the policy counter status of additional policy counters available at the CHF 120 or to unsubscribe from spending limit reporting. The PCF 110 may also use this operation to modify the policy counter status that may trigger a notification when matched or no longer matched for a policy counter identifier previously subscribed to.

If the PCF 110 provides the list of policy counter identifier(s), the CHF 120 returns the policy counter status, i.e. all policy counter statuses, per policy counter identifier provided by the PCF 110.

If the PCF 110 provides the list of policy counter identifiers, including existing or new policy counter identifier not previously subscribed to, and further provides per policy counter identifier the set of policy counter statuses that shall trigger a notification when matched or no longer matched, the CHF 120 returns the policy counter status per policy counter identifier only if current policy counter status matches (or does not match, depending on the condition discussed above) one of the provided policy counter statuses of the set.

Returning to the example relating to the policy counter 'GoldMBBCounter' in the beginning of section "detailed description", the PCF 110 may modify the subscription for notification of change and indicate that it is no longer interested in being notified about changes of policy counter statuses '2GBlimit' and 'under2GBlimit' for the policy counter 'GoldMBBCounter', but still interested in being notified about changes of policy counter statuses '5GBlimit' and 'under5GBlimit'. As in the example of FIG. 3, the PCF 110 may provide the notificationConditionInfo attribute related to this policy counter, i.e. 'GoldMBBCounter' to indicate that it is interested in being notified only when the "5GBlimit" is reached, or matched.

If the PCF 110 provides the list of policy counter identifiers and related statuses, but does not provide the indication about condition for reporting, the CHF 120, based on configuration, may assume that the notification shall be triggered when matched and/or no longer matched. Hence, the PCF 110 may only make use of the relevant information according to its policies.

One or more of the following actions may be performed in any suitable order.

Action 401

The PCF 110 may determine that policy decisions, to be taken to enforce a subscription plan for a user equipment, depend on the status of additional policy counters held at the CHF 120 or that notifications of policy counter status changes for some policy counters are no longer required, or that policy decisions depend on additional policy counter statuses, or no longer depend on certain policy counter statuses.

This action is similar to action A010.

Action 402

The PCF 110 may send a Nchf_SpendingLimitControl_Subscribe message, such as the request of FIG. 2, to the CHF 120, including the Subscription Correlation Id, policy counter status change indication, and an updated list of policy counter identifiers that overrides the previous list of policy counter identifiers that has been stored by the CHF 120. The PCF 110 may include, per policy counter identifier, an updated list of policy counter statuses that may trigger the CHF 120 to send a notification when one of the indicated policy counter status is met or when no longer is met. A possible implementation is to provide multiple instances of the policyCounterSubscriptionInfo including the PolicyCounterId and related policy counter statuses. The PCF 110 may also include the notificationConditionInfo as part of the policyCounterSubscriptionInfos to indicate the counter statuses for which the CHF 120 may notify when matched or no longer matched.

This action is similar to action A020.

Action 403

The CHF 120 may respond to the Nchf_SpendingLimitControl_Subscribe message and provide the policy counter status, and optionally pending policy counter statuses and their activation times, per required policy counter identifier, and stores or removes the PCF's subscription to spending limit reporting by comparing the updated list with the existing PCF subscriptions.

If the request included the set of policy counter statuses, the CHF 120 may notify on counter status matched, or no longer matched, the response includes the policy counter statuses that match for a policy counter identifier, and optionally the indication about condition for reporting together with their activation times. The CHF 120 stores the policy counter statuses of the set for these policy counters.

If no policy counter identifier(s) was provided, the CHF 120 returns the policy counter status, optionally including pending policy counter statuses and their activation times, for all policy counter(s), which are available for the user equipment 150 and registers that the PCF 110 may receive notification of change for all policy counters provided to the PCF 110.

This action is similar to action A050.

Figure 5:
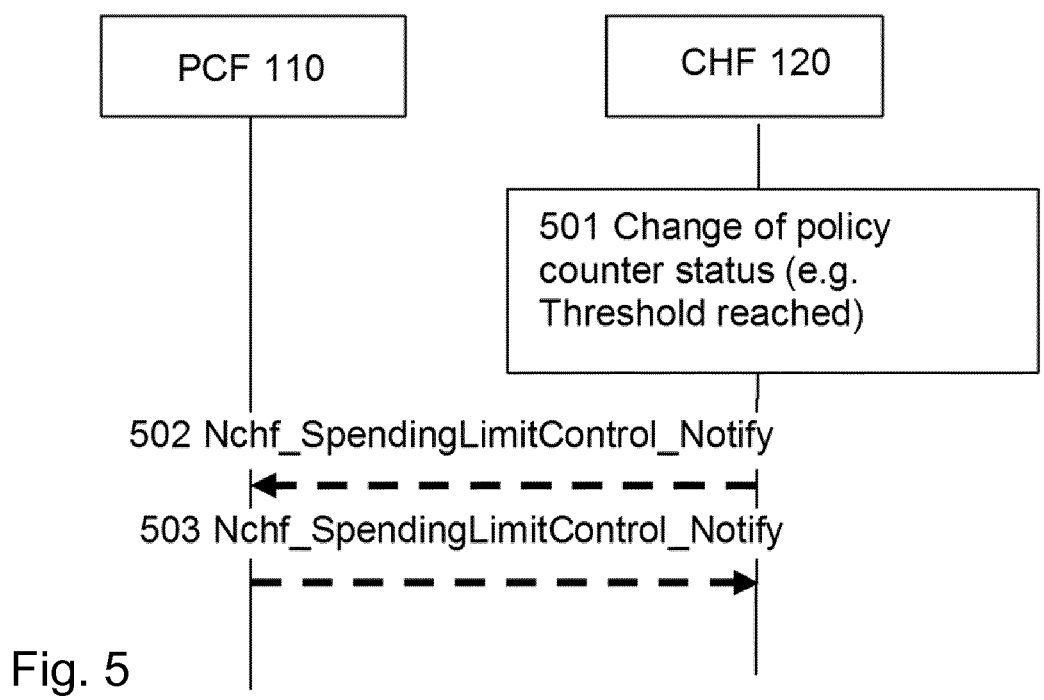
FIG. 5 is a still other exemplifying combined signaling and flowchart illustrating a still other exemplifying method.

In another example, as shown in FIG. 5, there is illustrated an exemplifying method relating to Spending Limit Report Notification.

FIG. 5 describes signaling flow for the CHF 120 to notify about change of the status of the subscribed policy counters available at the CHF 120 for that subscriber, or user equipment 150. Alternatively, the signaling flow may be used by the CHF 120 to provide one or more pending statuses for a subscribed policy counter together with the time they have to be applied.

When the subscription was for notification on specific counter status match, the CHF 120 may optionally provide the time at which the currently provided counter status does no longer match.

Again, discussing the example relating to 'GoldMBB-Counter' above, the CHF 120 may inform the PCF 110 when the policy counter status reaches the '2GBlimit', and when the notificationConditionInfo was provided by the PCF 110, the CHF 120 may also notify if the policy counter status no longer applies or if the policy counter status applies according to the notificationConditionInfo.

One or more of the following actions may be performed in any suitable order.

Action 501

The CHF 120 may detect that the policy counter status of a policy counter has changed and the PCF 110 subscribed to notifications of changes in the policy counter status of said policy counter. For example, the policy counter may have reached a threshold causing the policy counter status to change. Furthermore, it may be that the PCF 110 subscribed to notifications on policy counter status matching the recently acquired policy counter status or no longer matching the policy counter status previous to the acquired one.

Alternatively, the CHF 120 may detect that a policy counter status will change at a future point in time, and decides to instruct the PCF 110 to apply one or more pending policy counter statuses for a requested policy counter, or decides to indicate the PCF 110 when the currently notified counter status will no longer apply. As an example, the PCF 110—when the indicated time happens—may internally update the policy counter status to the value indicated in the pending/future policy status, without requiring a report of status change from the CHF 120.

This action is similar to action A070.

Action 502

The CHF 120 may send a Nchf_SpendingLimitControl_Notify message with the SUPI, Notification Target Address, and the policy counter status, and optionally the identifier of the policy counter and/or the indication about condition for reporting, i.e. matched or no longer matched, e.g. using the notificationConditionInfo.

Optionally, pending policy counter statuses and their activation times, for each policy counter that has changed and for which the PCF 110 subscribed to spending limit reporting. Optionally, and when the response includes the indication of policy counter status matched, and indication of counter status no longer matched and its activation time.

This action is similar to action A080.

Action 503

The PCF 110 may acknowledge the reception of the message transmitted by the CHF 120 in action 502 by sending a Nchf_SpendingLimitControl_Notify response and take that information into account as input for a policy decision.

Figure 6:
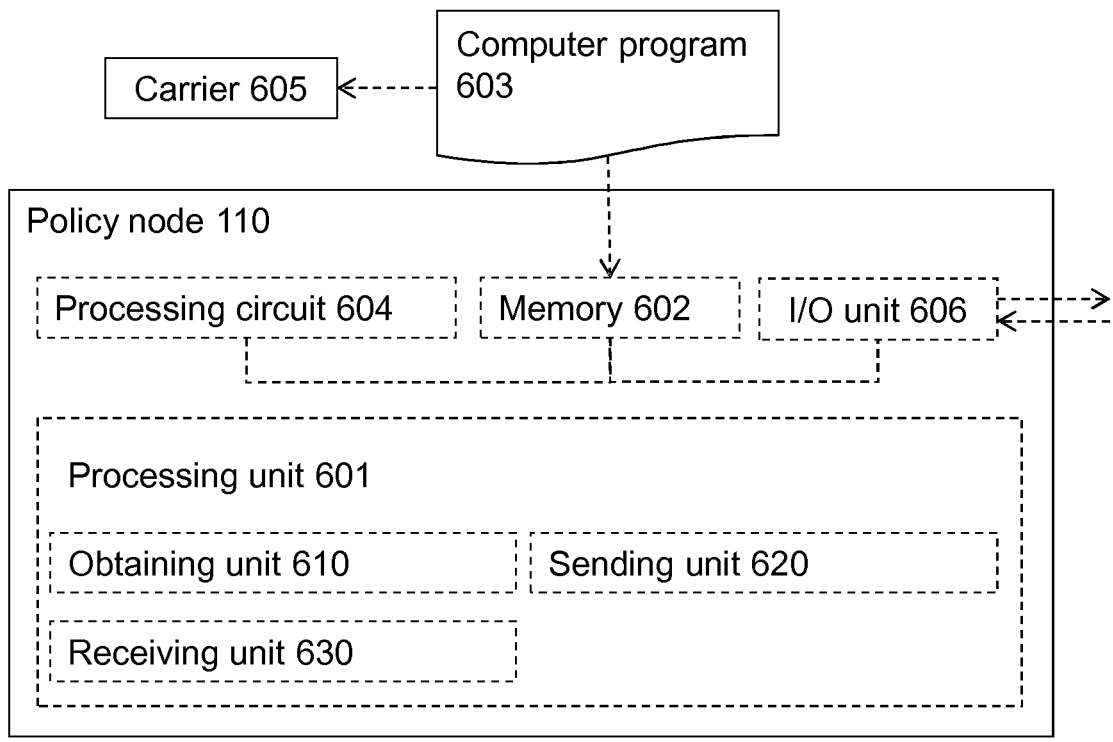
FIG. 6 is a block diagram illustrating embodiments of the policy node.

With reference to FIG. 6, a schematic block diagram of embodiments of the policy node 110 of FIG. 1 is shown.

The policy node 110 may comprise a processing unit 601, such as a means for performing the methods described herein. The means may be embodied in the form of one or more hardware units and/or one or more software units. The term "unit" may thus refer to a circuit, a software block or the like according to various embodiments as described below.

The policy node 110 may further comprise a memory 602. The memory may comprise, such as contain or store, instructions, e.g. in the form of a computer program 603, which may comprise computer readable code units.

According to some embodiments herein, the policy node 110 and/or the processing unit 601 comprises a processing circuit 604 as an exemplifying hardware unit, which may comprise one or more processors. Accordingly, the processing unit 601 may be embodied in the form of, or 'realized by', the processing circuit 604. The instructions may be executable by the processing circuit 604, whereby the policy node 110 is operative to perform the methods of FIG. 2. As another example, the instructions, when executed by the policy node 110 and/or the processing circuit 604, may cause the policy node 110 to perform the method according to FIG. 2.

In view of the above, in one example, there is provided a policy node 110 for enabling spending limit control for a user equipment 150 in a telecommunication network 100. Again, the memory 602 contains the instructions executable by said processing circuit 604 whereby the policy node 110 is operative to perform the method, performed by the policy node 110, according to FIG. 2.

FIG. 6 further illustrates a carrier 605, or program carrier, which provides, such as comprises, mediates, supplies and the like, the computer program 603 as described directly above. The carrier 605 may be one of an electronic signal, an optical signal, a radio signal and a computer readable medium.

In some embodiments, the policy node 110 and/or the processing unit 601 may comprise one or more of an obtaining unit 610, a sending unit 620, and a receiving unit 630 as exemplifying hardware units. The term "unit" may refer to a circuit when the term "unit" refers to a hardware unit. In other examples, one or more of the aforementioned exemplifying hardware units may be implemented as one or more software units.

Moreover, the policy node 110 and/or the processing unit 601 may comprise an Input/Output unit 606, which may be exemplified by the receiving unit and/or the sending unit when applicable.

Accordingly, the policy node 110 is configured for enabling spending limit control for a user equipment 150 in a telecommunication network 100.

Therefore, according to the various embodiments described above, the policy node 110 and/or the processing unit 601 and/or the obtaining unit 610 and/or the processing circuit 604 is configured for obtaining an identifier related to the user equipment 150, an identifier of a policy counter and a set of policy counter statuses to be monitored by the policy node 110. The set of policy counter statuses are related to the identifier of the policy counter.

The policy node 110 and/or the processing unit 601 and/or the sending unit 620 and/or the processing circuit 604 is configured for sending, to a charging node 120, a request for reporting of policy counter statuses related to the user equipment 150 for the policy counter. The request comprises the identifier related to the user equipment 150, the identifier of the policy counter and the set of policy counter statuses.

Furthermore, the policy node 110 and/or the processing unit 601 and/or the receiving unit 630 and/or the processing circuit 604 is configured for receiving, from the charging node 120, a response to the request. The response comprises a policy counter status of the set of policy counter statuses. The policy counter status has changed as determined by the charging node 120. Optionally, the response may also comprise the identifier of the policy counter.

The request may comprise an indication about condition for reporting. The condition for reporting concerns whether reporting is to be performed when the policy counter matches a corresponding policy counter status of the set of policy counter statuses or when the policy counter no longer matches the corresponding policy counter status of the set of policy counter statuses.

The policy node 110 and/or the processing unit 601 and/or the receiving unit 630 and/or the processing circuit 604 may be configured for receiving, from the charging node 120, a notification of change in policy counter status. The notification may comprise: the identifier related to the user equipment 150, a policy counter status of the set of policy counter statuses that changed, and a current indication about condition for reporting the notification. Optionally, the notification may also comprise the identifier of the policy counter. The current indication indicates whether the policy counter status matches or no longer matches.

Figure 7:
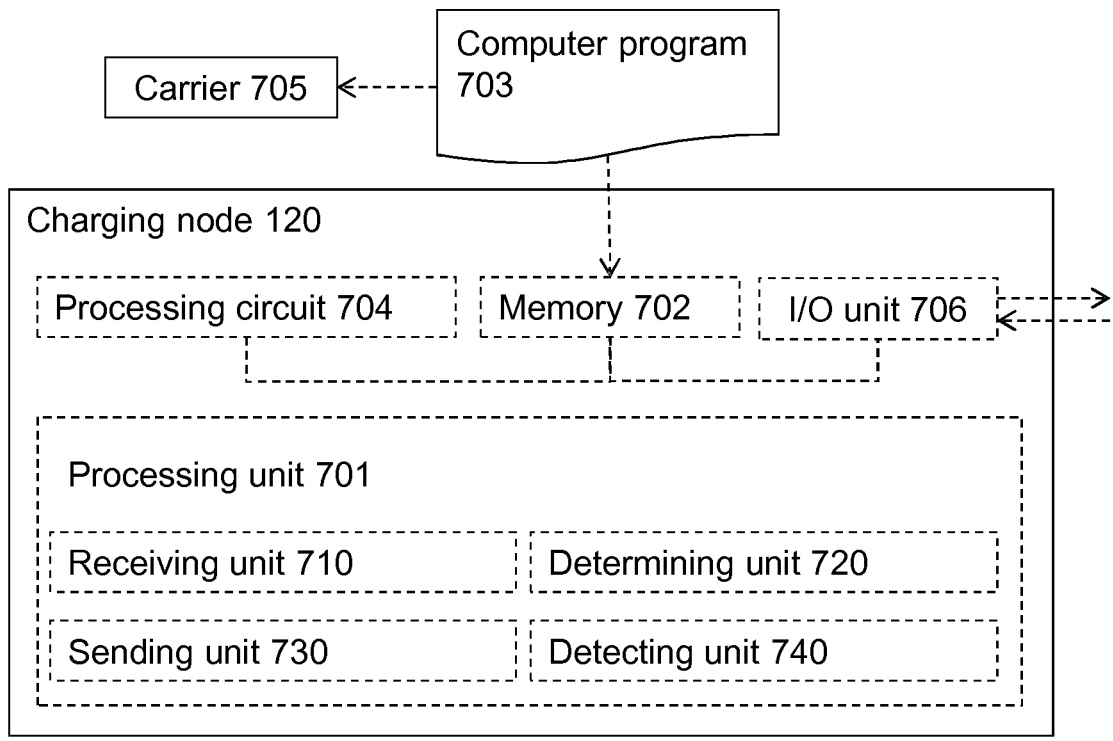
FIG. 7 is a block diagram illustrating embodiments of the charging node.

With reference to FIG. 7, a schematic block diagram of embodiments of the charging node 120 of FIG. 1 is shown.

The charging node 120 may comprise a processing unit 701, such as a means for performing the methods described herein. The means may be embodied in the form of one or more hardware units and/or one or more software units. The term "unit" may thus refer to a circuit, a software block or the like according to various embodiments as described below.

The charging node 120 may further comprise a memory 702. The memory may comprise, such as contain or store, instructions, e.g. in the form of a computer program 703, which may comprise computer readable code units.

According to some embodiments herein, the charging node 120 and/or the processing unit 701 comprises a processing circuit 704 as an exemplifying hardware unit. Accordingly, the processing unit 701 may be embodied in the form of, or 'realized by', the processing circuit 704. The instructions may be executable by the processing circuit 704, whereby the charging node 120 is operative to perform the methods of FIG. 2. As another example, the instructions, when executed by the charging node 120 and/or the processing circuit 704, may cause the charging node 120 to perform the method according to FIG. 2.

In view of the above, in one example, there is provided a charging node 120 for enabling spending limit control for a user equipment 150 in a telecommunication network 100. Again, the memory 702 contains the instructions executable by said processing circuit 704 whereby the charging node 120 is operative to perform the method, performed by the charging node 120, according to FIG. 2.

FIG. 7 further illustrates a carrier 705, or program carrier, which provides, such as comprises, mediates, supplies and the like, the computer program 703 as described directly above. The carrier 705 may be one of an electronic signal, an optical signal, a radio signal and a computer readable medium.

In further embodiments, the charging node 120 and/or the processing unit 701 may comprise one or more of a receiving unit 710, a determining unit 720, a sending unit 730, and a detecting unit 740 as exemplifying hardware units. The term "unit" may refer to a circuit when the term "unit" refers to a hardware unit. In other examples, one or more of the aforementioned exemplifying hardware units may be implemented as one or more software units.

Moreover, the charging node 120 and/or the processing unit 701 may comprise an Input/Output unit 706, which may be exemplified by the receiving unit and/or the sending unit when applicable.

Accordingly, the charging node 120 is configured for enabling spending limit control for a user equipment 150 in a telecommunication network 100.

Therefore, according to the various embodiments described above, the charging node 120 and/or the processing unit 701 and/or the receiving unit 710 and/or the processing circuit 704 is configured for receiving, from a policy node 110, a request for reporting of policy counter statuses related to the user equipment 150 for a policy counter. The request comprises an identifier related to the user equipment 150, an identifier of the policy counter and a set of policy counter statuses.

Furthermore, the charging node 120 and/or the processing unit 701 and/or the determining unit 720 and/or the processing circuit 704 is configured for determining a policy counter status of the set of policy counter statuses. The policy counter status has changed as determined by the charging node 120.

The charging node 120 and/or the processing unit 701 and/or the sending unit 730 and/or the processing circuit 704 is configured for sending, to the policy node 110, a response to the request. The response comprises the policy counter status that has changed. Optionally, the response may also comprise the identifier of the policy counter.

The request for reporting of policy counter statuses may comprise an indication about a condition for reporting. The condition for reporting may concern whether the reporting is to be performed when the policy counter matches a corresponding policy counter status of the set of policy counter statuses or when the policy counter no longer matches the corresponding policy counter status of the set of policy counter statuses.

The charging node 120 and/or the processing unit 701 and/or the detecting unit 740 and/or the processing circuit 704 may be configured for detecting that a previous policy counter status has changed to a current policy counter status and that the current policy counter status complies with the indication.

The charging node 120 and/or the processing unit 701 and/or the sending unit 730 and/or the processing circuit 704 may be configured for sending, to the policy node 110, a notification of change in policy counter status. The notification may comprise: the identifier related to the user equipment 150, the current policy counter status, and the indication about condition for reporting. Optionally, the notification may also comprise the identifier of the policy counter.

The charging node 120 and/or the processing unit 701 and/or the sending unit 730 and/or the processing circuit 704 may be configured for sending the indication about condition for reporting.

As used herein, the term "node", or "network node", may refer to one or more physical entities, such as devices, apparatuses, computers, servers or the like. This may mean that embodiments herein may be implemented in one physical entity. Alternatively, the embodiments herein may be implemented in a plurality of physical entities, such as an arrangement comprising said one or more physical entities, i.e. the embodiments may be implemented in a distributed manner, such as on a cloud system, which may comprise a set of server machines. In case of a cloud system, the term "node" may refer to a virtual machine, such as a container, virtual runtime environment, a software module or the like. The virtual machine may be assembled from hardware resources, such as memory, processing, network and storage resources, which may reside in different physical machines, e.g. in different computers.

As used herein, the term "unit" may refer to one or more functional units, each of which may be implemented as one or more hardware units and/or one or more software units and/or a combined software/hardware unit in a node. In some examples, the unit may represent a functional unit realized as software and/or hardware of the node.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a determining means, estimating means, capturing means, associating means, comparing means, identification means, selecting means, receiving means, sending means or the like as disclosed herein. As an example, the expression "means" may be a unit corresponding to the units listed above in conjunction with the Figures.

As used herein, the term "software unit" may refer to a software application, a Dynamic Link Library (DLL), a software component, a software module, a software object, an object according to Component Object Model (COM), a software function, a software engine, an executable binary software file or the like.

The terms "processing unit" or "processing circuit" may herein encompass a processing unit, comprising e.g. one or more processors, an Application Specific Integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a Digital Versatile Disc (DVD), a Blu-ray disc, a software unit that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of digit, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the terms "first", "second", "third" etc. may have been used merely to distinguish features, apparatuses, elements, units, or the like from one another unless otherwise evident from the context.

As used herein, the term "subsequent action" may refer to that one action is performed after a preceding action, while additional actions may or may not be performed before said one action, but after the preceding action.

As used herein, the term "set of" may refer to one or more of something. E.g. a set of devices may refer to one or more devices, a set of parameters may refer to one or more parameters or the like according to the embodiments herein.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a policy node, for enabling spending limit control for a user equipment in a telecommunication network, the method comprising:

obtaining an identifier related to the user equipment, an identifier of a policy counter and a set of policy counter statuses to be monitored by the policy node, the set of policy counter statuses being related to the identifier of the policy counter;

sending, to a charging node, a request for reporting of policy counter statuses related to the user equipment for the policy counter, the request comprising the identifier related to the user equipment, the identifier of the policy counter, the set of policy counter statuses and an indication about condition for reporting, the condition for reporting concerning whether reporting is to be performed when the policy counter matches a corresponding policy counter status of the set of policy counter statuses or when the policy counter no longer matches the corresponding policy counter status of the set of policy counter statuses;

receiving, from the charging node, a notification of change in policy counter status, the notification comprising:

the identifier related to the user equipment, the policy counter status of the set of policy counter statuses that changed, and a current indication about condition for reporting the notification, the current indication indicating whether the policy counter status matches or no longer matches; and receiving, from the charging node, a response to the request, the response comprising the policy counter status of the set of policy counter statuses, the policy counter status having changed as determined by the charging node.

2. A policy node configured for enabling spending limit control for a user equipment in a telecommunication network, the policy node being configured for:

obtaining an identifier related to the user equipment, an identifier of a policy counter and a set of policy counter statuses to be monitored by the policy node, the set of policy counter statuses being related to the identifier of the policy counter;

sending, to a charging node, a request for reporting of policy counter statuses related to the user equipment for the policy counter, the request comprising the identifier related to the user equipment, the identifier of the policy counter, the set of policy counter statuses and an indication about condition for reporting, the condition for reporting concerning whether reporting is to be performed when the policy counter matches a corresponding policy counter status of the set of policy counter statuses or when the policy counter no longer matches the corresponding policy counter status of the set of policy counter statuses;

receiving, from the charging node, a notification of change in policy counter status, the notification comprising:
  the identifier related to the user equipment, the policy counter status of the set of policy counter statuses that changed, and a current indication about condition for reporting the notification, the current indication indicating whether the policy counter status matches or no longer matches; and receiving, from the charging node, a response to the request, the response comprising the policy counter status of the set of policy counter statuses, wherein the policy counter status has changed as determined by the charging node.

\* \* \* \* \*